United States Patent
Weiler et al.

(10) Patent No.: US 6,285,926 B1
(45) Date of Patent: Sep. 4, 2001

(54) SELECTED HOVER ALTITUDE DEVIATION DISPLAY AND METHOD

(75) Inventors: David J. Weiler, Marion; Michael J. Marks, Cedar Rapids, both of IA (US)

(73) Assignee: Rockwell Collins, Cedar Rapids, IA (US)

( * ) Notice: Subject to any disclaimer, the term of this patent is extended or adjusted under 35 U.S.C. 154(b) by 0 days.

(21) Appl. No.: 09/561,478

(22) Filed: Apr. 28, 2000

(51) Int. Cl.$^7$ ........................................... G05D 1/00
(52) U.S. Cl. .................. 701/4; 701/15; 701/16; 244/75 R; 340/973; 340/979; 73/178 T
(58) Field of Search ................ 701/3, 4, 10, 11, 701/14, 15, 16, 17, 18, 211; 244/17.13, 180, 186, 1 R, 75 R; 340/973, 977, 979; 73/178 H, 178 R, 178 T (56) References Cited

U.S. PATENT DOCUMENTS

| | | | |
|---|---|---|---|
| 4,645,141 | 2/1987 | McElreath | 244/17.13 |
| 5,150,117 | 9/1992 | Hamilton et al. | 340/945 |
| 5,296,854 | 3/1994 | Hamilton et al. | 340/980 |
| 5,978,715 | * 11/1999 | Briffe et al. | 701/11 |

\* cited by examiner

*Primary Examiner*—William A. Cuchlinski, Jr.
*Assistant Examiner*—Yonel Beaulieu
(74) *Attorney, Agent, or Firm*—Nathan O. Jensen; Kyle Eppele (57) ABSTRACT

A selected hover altitude deviation display and method for displaying the difference between the current altitude of an aircraft and a selected hover altitude on a multi-functional display unit that includes a compass rose and an aircraft symbol. An altitude sensor generates current altitude data, which is transmitted to a computer processing unit together with a selected hover altitude. The selected hover altitude is determined by the pilot of the aircraft. The selected hover altitude is displayed as a static, analog symbolic representation on the multi-functional display unit. The hover altitude deviation is displayed as a dynamic, analog symbolic representation of the difference between the current altitude of the aircraft and the selected hover altitude. With the selected hover altitude deviation display, the pilot can readily see if his aircraft is above or below a selected hover altitude without relying on external visual reference cues.

21 Claims, 6 Drawing Sheets

SELECTED HOVER ALTITUDE DEVIATION DISPLAY AND METHOD

FIELD OF THE INVENTION

The present invention relates to aircraft control systems and, more particularly, to a display indicating the relation between the current altitude of the aircraft and a selected hover altitude of the aircraft.

BACKGROUND OF THE INVENTION

Military and civilian vertical take off aircraft, such as helicopters and jump jets, spend a part of flight time in a hover condition. In some cases, the aircraft is hovering over unprepared surfaces with few references to maintain a desired altitude. Providing altitude references or cues to the pilot of the aircraft, historically, has been limited to analog dials on board the aircraft with varying scales and resolution. Some graphical displays have been developed, yet these fail to provide the resolution in altitude to be of practical use.

Thus, there is a continuing need for a display that indicates a selected hover altitude and the difference between the current altitude of the aircraft, and the selected hover altitude. There is also a need to provide a display that graphically illustrates the current position of the aircraft with respect to a selected hover altitude. The hover altitude deviation display should be able to display the selected hover altitude and the difference between the selected hover altitude and the actual altitude of the aircraft as well as display graphically the position of the aircraft, above or below, the selected hover altitude within limits selected by the pilot or designed in the display system.

SUMMARY OF THE INVENTION

The present invention provides a selected hover altitude deviation display and method for displaying the difference between the current altitude of an aircraft and a selected hover altitude on a multi-functional display unit that includes a compass rose and an aircraft symbol. An altitude sensor generates current altitude data, which is transmitted to a computer processing unit together with a selected hover altitude. The selected hover altitude is determined by the pilot of the aircraft. The selected hover altitude is displayed as a static, analog symbolic representation on the multi-functional display unit. The hover altitude deviation is displayed as a dynamic, analog symbolic representation of the difference between the current altitude of the aircraft and the selected hover altitude. With the selected hover altitude deviation display of the present invention, the pilot can readily see if his aircraft is above or below a selected hover altitude without relying on external visual reference cues.

Other features and advantages of the present invention will become apparent in the following detailed description, appended drawings and accompanying claims.

Before explaining the preferred embodiment of the invention in detail, it is to be understood that the invention is not limited in the application to the details of construction and the arrangement of components set forth in the following description or as illustrated in the drawings. The invention is capable of other embodiments or being practiced or carried out in various ways. Also, it is to be understood that the phraseology and terminology employed herein is for the purpose of description and should not be regarded as limiting.

DETAILED DESCRIPTION OF THE PREFERRED EMBODIMENT

In today's aircraft, the ability to maintain stable flight and maneuvers is provided by computer processing units receiving information from various inputs, including those of the pilot. As avionics becomes more complicated, particularly for vertical take-off capable aircraft, such as helicopters, jump jets (Harrier) and fixed-wing/rotor aircraft (Osprey) the ability to hover over unprepared surfaces is difficult and complicated. Many such aircraft rely on electro-optical systems that generate symbolic and digital status information based on various aircraft subsystems and superimpose such symbolic status information images into the pilot's field of vision. Such displays can be on heads-up displays projected on the cockpit windshield or cockpit instrument panels or helmet displays. Sensors interfaced with various aircraft subsystems and are operative to provide continuous streams of raw data regarding the status of such subsystems. Processors on board the aircraft are operative to provide continuous streams of both raw and processed (either combined raw data or derived database upon raw data) data representative of the aircraft status and related information. Symbolic stimuli (symbols) are generally more advantageously utilized where relative discriminations based upon quantitative status information are required.

The Applicants herein disclose a hover altitude deviation display which provides symbolic depictions of the aircraft's hover altitude with respect to a preselected hover altitude. Referring now to the drawings, FIGS. 1–6, wherein like numerals are used to show like elements throughout, there is shown the preferred embodiments of the selected hover altitude deviation display in accordance with the present invention.

Figure 1:
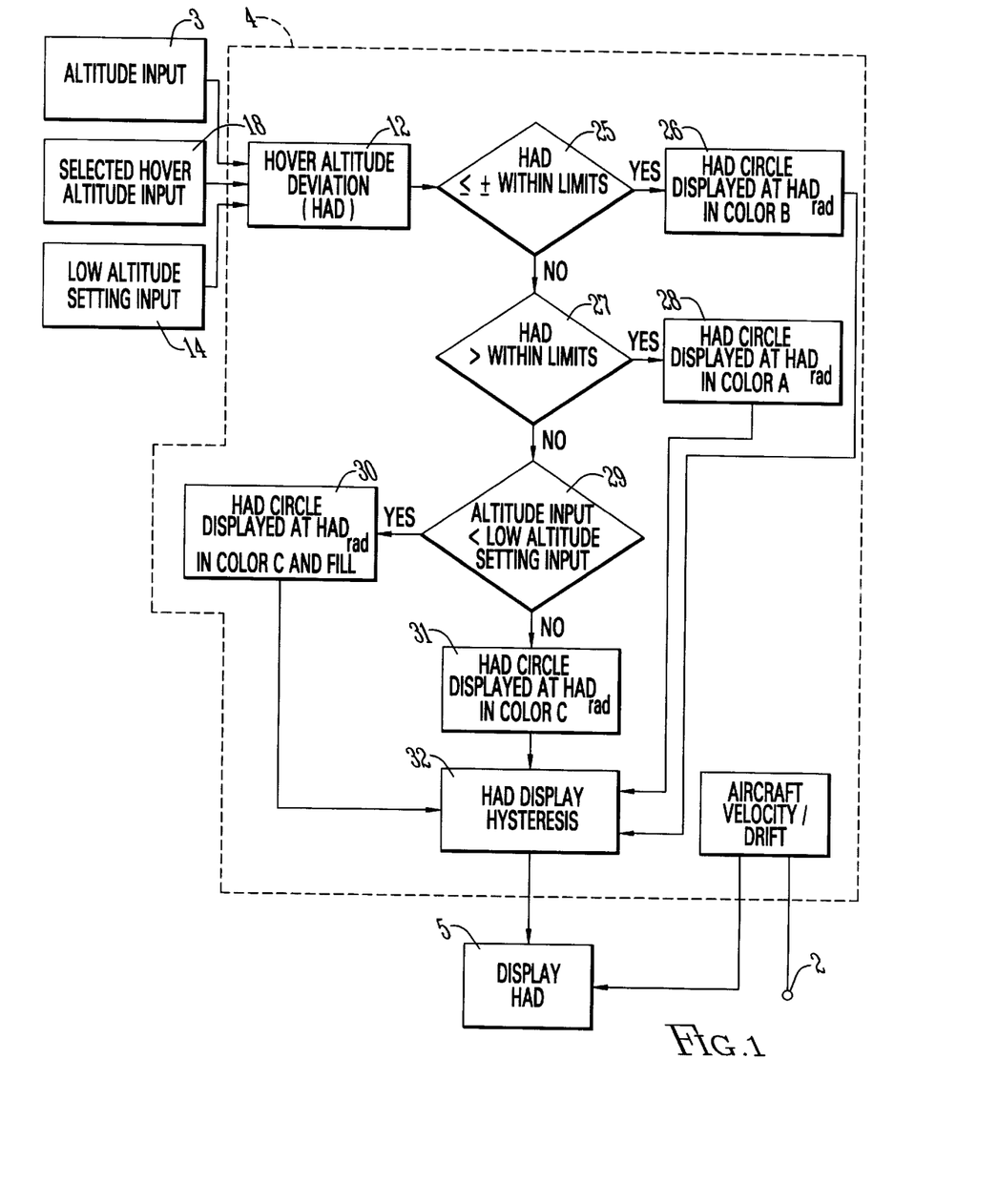
FIG. 1 is a schematic diagram illustrating the logic flow of one embodiment of the present invention representing the hover altitude deviation display as a circle.

FIG. 1 illustrates a schematic diagram of the logic flow of the hover altitude deviation display of the present invention and FIGS. 2–6 illustrate a screen of a multi-functional display unit 5 depicting various conditions and data displayed thereon.

A multi-functional display unit 5 that includes a compass rose 6 and an aircraft symbol 8 is positioned in the aircraft to be in the field of vision of the pilot. The multi-functional display unit 5, as shown in the FIGURES, can display the aircraft's heading 7 as well as the horizontal and vertical velocity of the aircraft as represented by the line symbols 9 in FIGS. 2–6. Such velocities are typically obtained by Doppler radar. An altitude sensor provides altitude input 3 for generating raw data signals representing the status information of the current altitude of the aircraft with respect to the external environment of the aircraft. Such altitude sensor can typically be a radar altimeter which provides aircraft altitude above the ground. The altitude input 3 information is input into a computer processing unit 4 for defining the spatial location and perspective of the multi-functional display unit 5 based upon signals generated by the altitude input 3 and the aircraft velocity/drift input 2. The computer processing unit 4 is operative to generate a combined analog/digital hover altitude deviation display that provides visual representations regarding the current altitude of the aircraft with respect to a selected hover altitude input 18. The selected hover altitude input 18 is provided by the pilot of the aircraft in a convenient manner, such as an analog dial, computer keyboard, a touch screen or a voice recognition subsystem. With the altitude input 3 and the selected hover altitude input 18, the hover altitude deviation 12 can be determined by the computer processing unit 4. The hover altitude deviation 12 is displayed on the multi-functional display unit 5 as a dynamic analog symbolic representation of the difference between the current altitude of the aircraft and the selected hover altitude. The selected hover altitude is displayed on the multi-functional display unit 5 as a static analog symbolic representation 20 (See FIG. 2). The symbolic representation for both the selected hover altitude and the hover altitude deviation display 10 can be one selected from a group comprising a circle, a triangle and a polygon. The hover altitude deviation display 10 provides a visual indication of the spacial location of the aircraft with respect to the selected hover altitude 20 indicated on the multi-functional display unit 5.

The present invention will also display a digital representation on the multi-functional display unit 5 of the current altitude 22 of the aircraft and the selected hover altitude 23. FIGS. 2–6 show the selected hover altitude 23 as being 80 feet. The actual altitude 22 of the aircraft in each of the respective FIGURES changes as the altitude of the aircraft changes. In each of the FIGURES, the selected hover altitude deviation display 10 is a circle and changes its radius as the difference between the actual aircraft altitude 22 varies from the selected hover altitude 23 as displayed on the multi-functional display unit 5.

Additional embodiments of the present invention include displaying the hover altitude deviation display 10 not in a solid line representation. The hover altitude deviation display is shown in the FIGURES as a solid line circle; however, it should be understood that the circle could also be a broken line circle or a dotted circle or a triangle or a polygon.

An additional assistance to the pilot viewing the selected hover altitude deviation display 10 of the present invention is the utilization of the color of the displays. The hover altitude deviation display 10 can be a color different from the color of the selected hover altitude 20 when the current altitude 22 of the aircraft is not equal to the selected hover altitude 23. In the case when the current altitude 22 of the aircraft is equal to the selected hover altitude 23, the hover altitude deviation display 10 is a color that is the same as a color of the selected hover altitude thereby indicating that the pilot has established the aircraft's actual altitude display 20 at the selected hover altitude. In viewing the selected hover altitude deviation display 10 of the present invention, the pilot of the aircraft does not have to do any mental calculations as to whether he is above or below the selected hover altitude but merely has to view the multi-functional display unit 5. With an appropriate selection of symbolic representations and colors, the pilot can determine, by merely viewing the display, his location with respect to the selected hover altitude and not have to rely on external visual cues. It should be understood that FIGS. 2–6 display the selected hover altitude deviation as a solid circle and in black and white colors but that other color can be utilized.

Figure 6:
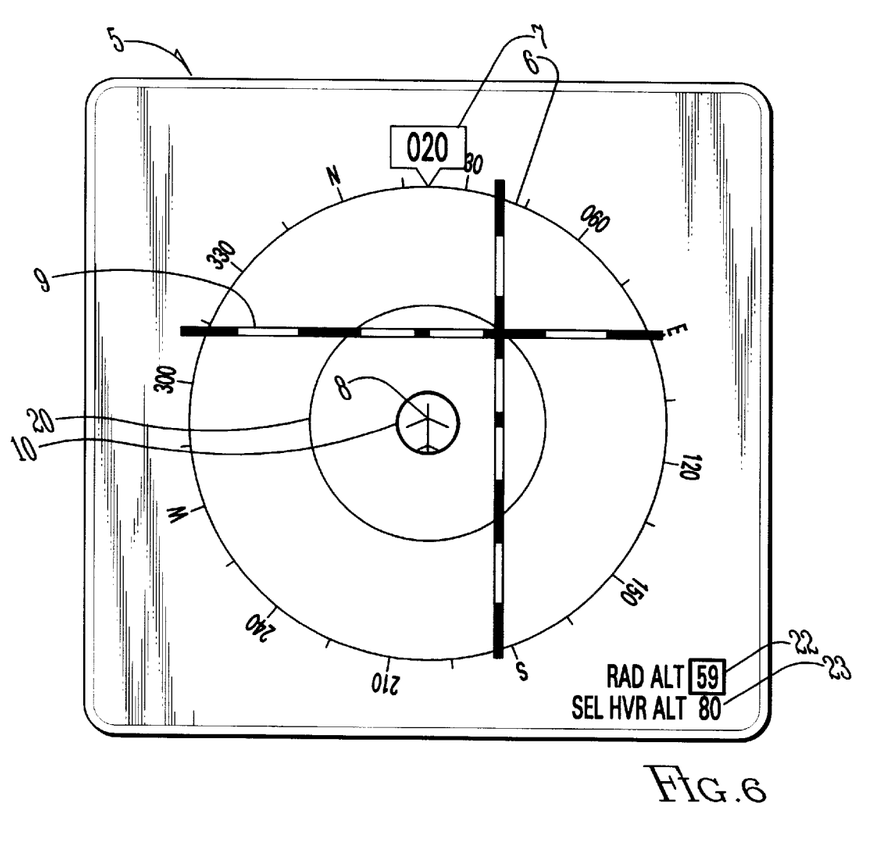
FIG. 6 is an illustration of a multi-functional display unit screen of the present invention depicting the hover altitude deviation display inside the selected hover altitude representation and touching the aircraft symbol in the center of the display which means that the current altitude of the aircraft is at the "within limit" parameter defined by the low altitude setting. If the aircraft's current altitude is outside the "within limit" parameter, the hover altitude deviation display will be filled-in which means that the aircraft is below an acceptable altitude.

The present invention also provides for a low altitude setting input 14 which can be selected by the pilot or defined by the manufacturer of the display unit. The low altitude setting is a limiting parameter that defines the lowest acceptable altitude for the aircraft with respect to its hover altitude. The low altitude setting selector 14 is disposed in interactive relation with the computer processing unit 4 for designating a low altitude setting and the computer processing unit 4 generates a second dynamic analog symbolic representation when the aircraft exceeds the selected low altitude setting. Such condition is illustrated in FIG. 6 wherein the hover altitude deviation display 10 is touching the wing representations of the aircraft symbol 8 on the multi-functional display unit 5. If the condition of the present altitude of the aircraft is below the selected low altitude setting, the second dynamic analog symbolic representation is a filling in of the hover altitude deviation display disposed on the multi-functional display unit 5. The hover altitude deviation display 10 illustrated in the FIGURES is a circle, the radius of which is proportional to the percent of distance from the center of the multi-functional display unit screen 5 to the inside parameter of the compass rose 6 also displayed on the multi-functional display unit 5. The hover altitude deviation display 10 has a defined display range as defined by the pilot or as built-in to the present invention. Such display range is set at a minimum (+/−) certain footage, i.e., (+/−) 20 feet for a 40 foot range or (+/−) 10 feet for a 20 foot range. The hover altitude deviation display 10 of the present invention also has a "within limits" parameter that equals acceptable deviation from the selected hover altitude setting. Such "within limits" parameter is defined in a conventional and convenient manner by the pilot such as (+/−) 5 feet providing a 10 foot range.

Figure 2:
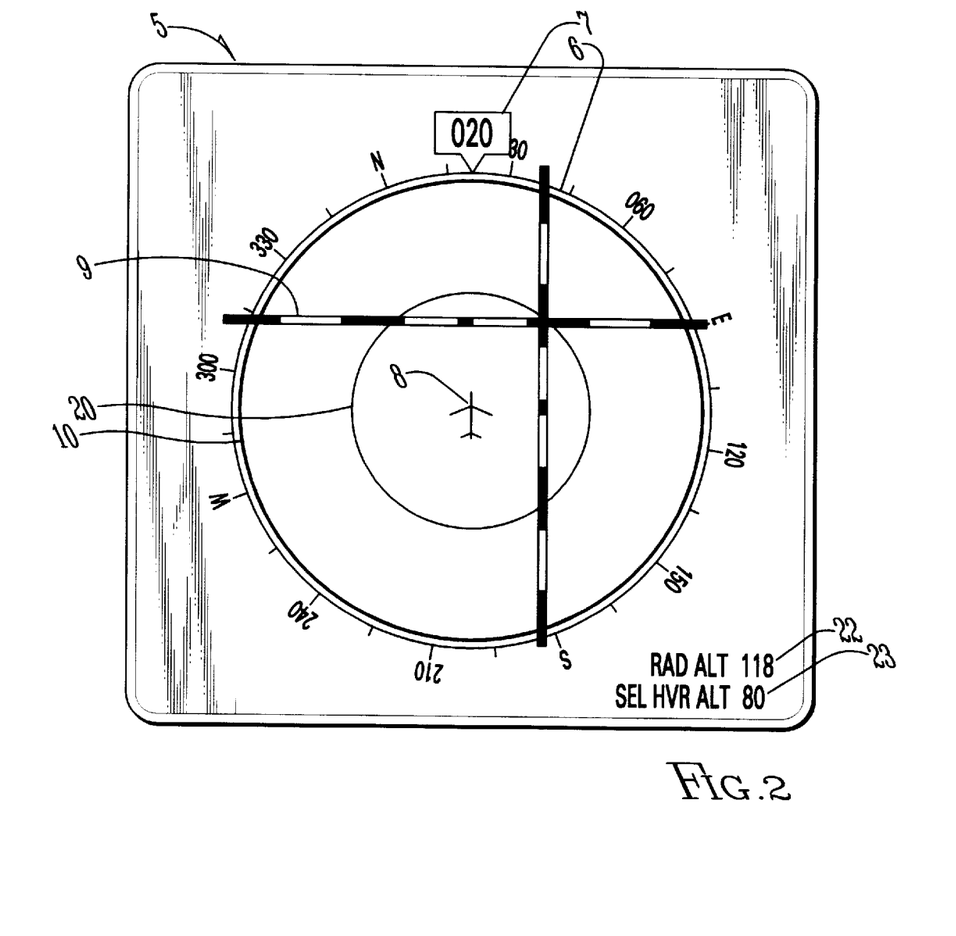
FIG. 2 is an illustration of a multi-functional display unit screen of the present invention depicting the selected hover altitude as a circle and the hover altitude deviation display as a circle just inside the compass nose.

Referring now to FIG. 1, in operation, the hover altitude deviation display 12 is provided with an altitude input 3 as well as a selected hover altitude input 18 and a low altitude setting input 14. The latter two parameters are pilot selected with the altitude input being provided by a sensor, such as a radar altimeter or radio transmission. Additional information, such as aircraft velocity/drift 2, relative to its horizontal, vertical and lateral velocities, are input into the system by, for instance, Doppler radar inputs. With such inputs, the computer processing unit 4 determines the hover altitude deviation 12 and generates a plurality of symbolic representations of such information. Referring to FIG. 2, the hover altitude deviation display 10 is shown just inside the compass rose 6 on the multi-functional display unit 5. The horizontal and vertical velocities are displayed 9 on the compass rows 6. The selected hover altitude 20 is displayed as a circle and the aircraft symbol 8 is displayed in the center of the screen. The digital representation of the selected hover altitude is displayed in the lower right hand corner of the screen 23 and actual altitude of the aircraft is displayed at 22 as the radar altitude. The location of such digital representations can be at any useful and convenient place on the multi-functional display unit 5. The hover altitude deviation display 10 of the present invention is generated by the computer processing unit 4 when it determines if the hover altitude deviation 12 is greater than or equal to the (+/−) "within limits" 25. If the deviation is within the set limits, the hover altitude deviation circle is displayed within the compass rows 6 as a color B. It should be understood that the selection of colors is arbitrary but different and distinct from the other colors displayed. In this case, color B can be the color green indicating that the hover altitude deviation 12 is within the limits as established by the pilot. If the hover altitude deviation is not within the limits 27 then the hover altitude deviation circle 10 will be displayed in a color A 28. If the hover altitude deviation is less than the "within limits" then the hover altitude deviation is compared to the low altitude setting input 29, in which case a third color C is displayed on the multi-functional display unit 5. If the actual altitude of the aircraft is at the low altitude setting 31, the hover altitude deviation display 10 encircles and is in contact with the aircraft symbol 8 as shown in FIG. 6. If the actual altitude of the aircraft is below the low altitude setting input then the hover altitude deviation display is the color C and the circle is filled in 30. In all cases of the display, the hysteresis function 32 prevents the hover altitude deviation circle from flickering between colors when it is in transition or near stated limits.

Figure 3:
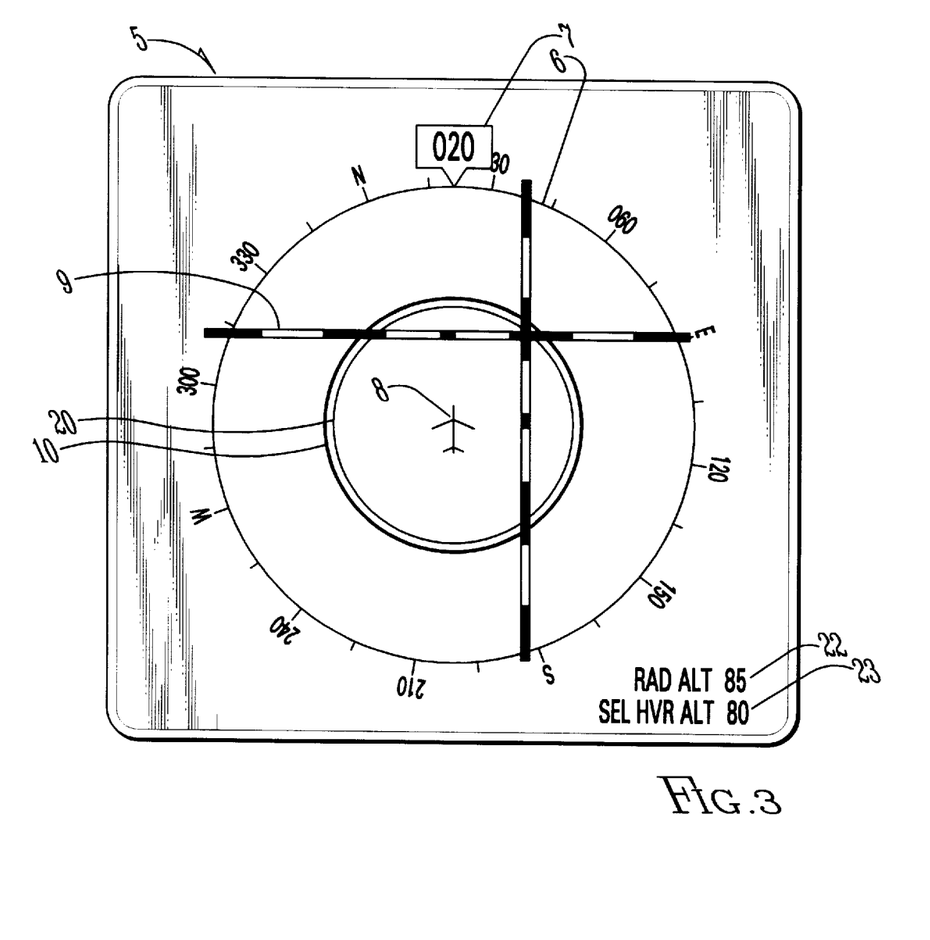
FIG. 3 is an illustration of a multi-functional display unit screen of the present invention depicting the hover altitude deviation display near and above the selected hover altitude representation which means that the current altitude of the aircraft is higher than but close to the selected hover altitude.
Figure 4:
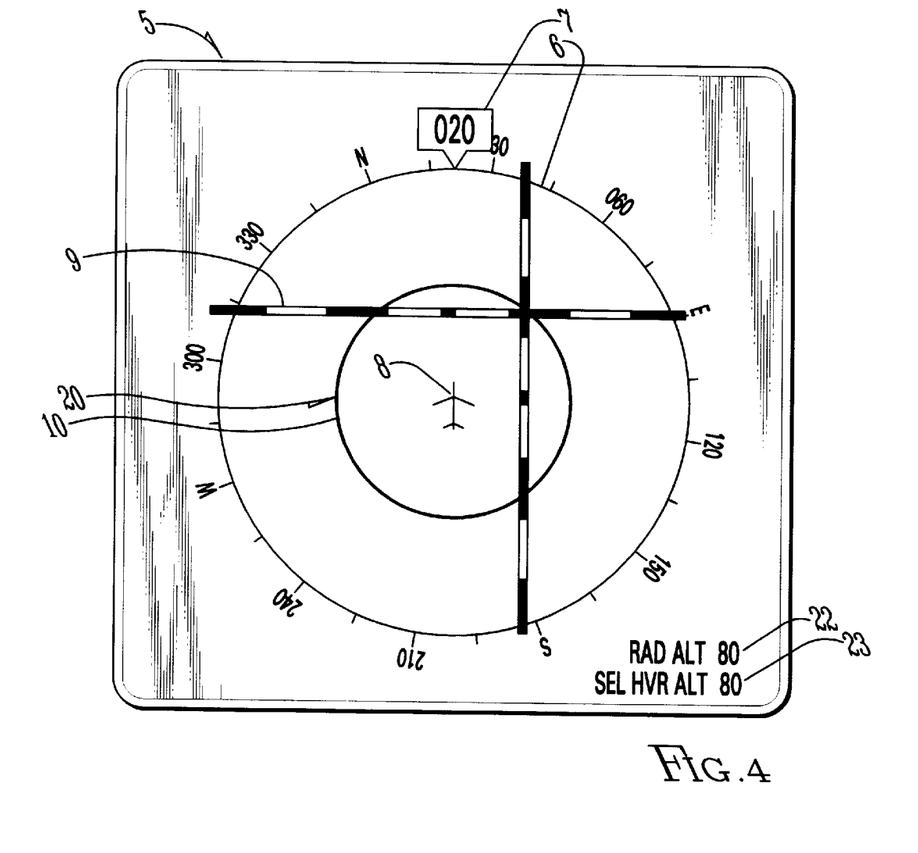
FIG. 4 is an illustration of a multi-functional display unit screen of the present invention depicting the hover altitude deviation display overlaid the selected hover altitude representation which means the current altitude of the aircraft is the same as the selected hover altitude.
Figure 5:
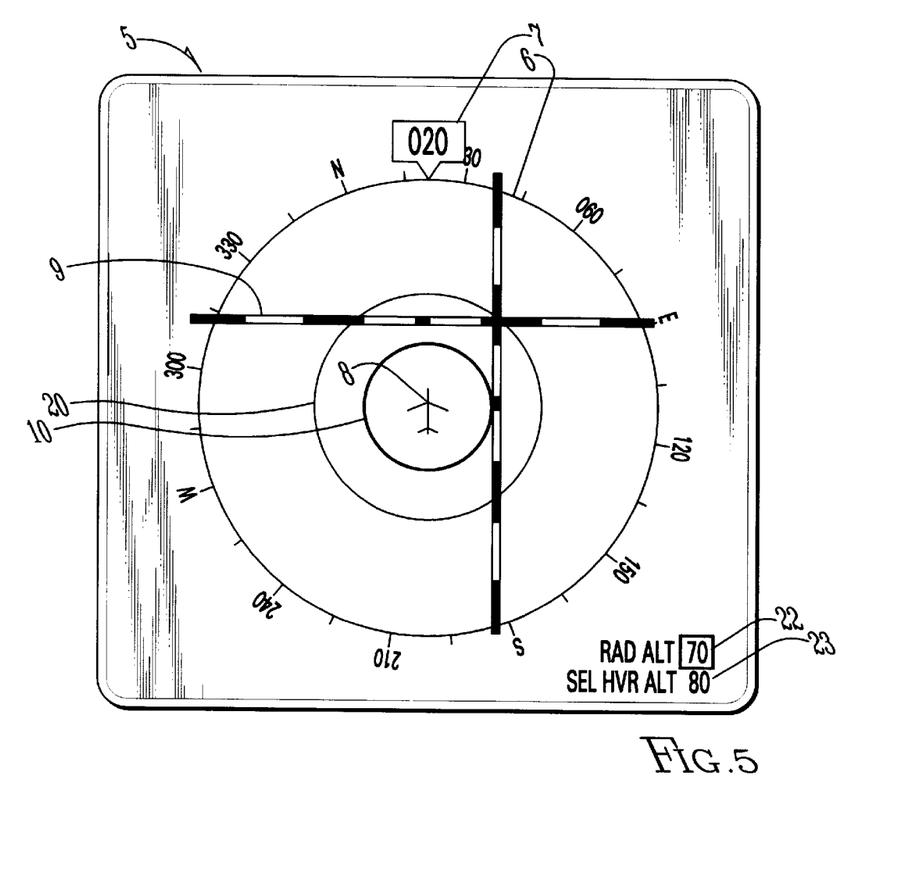
FIG. 5 is an illustration of a multi-functional display unit screen of the present invention depicting the hover altitude deviation display inside the selected hover altitude representation which means the current altitude of the aircraft is lower than the selected hover altitude.

FIG. 3 shows the hover altitude deviation display 10 as being just outside the selected hover altitude 22 and the digital representations show that the actual altitude 22 of the aircraft is 5 feet above the selected hover altitude 23. FIG. 4 illustrates that the actual altitude of the aircraft 22 is the same as the selected hover altitude 23 and the hover altitude deviation display circle 10 overlays the symbolic representation of the selected hover altitude 20. FIG. 5 illustrates that the actual aircraft altitude 22 is below the selected hover altitude 23 with the hover altitude deviation display circle 10 displayed inside the symbolic representation of the selected hover altitude 20. In all cases, the scalings of the symbolic representations shall be the same for a positive deviation and a negative deviation. If the radar altitude or the selected hover altitude setting is invalid or unavailable, the hover altitude deviation display shall be removed from the screen of the multi-functional display unit 5 or shall not appear in the first instance.

Thus, it should be apparent that it has been provided in accordance with the present invention a selected hover altitude deviation display and method in which a symbolic representation of the difference between the actual altitude of an aircraft and a selected hover altitude is displayed to the pilot of the aircraft has been disclosed. Although the invention has been described in conjunction with specific embodiments thereof, it is evident that many alternatives, modifications and variations will be apparent to the ordinarily skilled in the art. Accordingly, it is intended to embrace all such alternatives, modifications and variations that fall within the spirit and scope of the appended claims.

What is claimed is:

1. A selected hover altitude deviation display in an aircraft having a multi-functional display unit that includes a compass rose and an aircraft symbol, the selected hover altitude deviation display comprising:

an altitude sensor for generating raw data signals representing status information of current altitude of the aircraft with respect to an external environment of the aircraft, and a computer processing unit for defining the spatial location and perspective of the multi-functional display unit based upon the signals generated by the altitude sensor, the computer processing unit being operative to generate a combined analog/digital hover altitude deviation display that provides visual representations regarding the current altitude of the aircraft with respect to a selected hover altitude, the analog/digital hover altitude deviation display comprising:

a static, analog symbolic representation of the selected hover altitude displayed on the multi-functional display unit, and a dynamic, analog symbolic representation of the difference between the current altitude of the aircraft and the selected hover altitude, the analog/digital hover altitude deviation display disposed on the multi-functional display unit to provide a visual indication of the spatial location of the aircraft with respect to the selected hover altitude indicated on the multi-functional display unit.

2. The selected hover altitude deviation display of claim 1, wherein the symbolic representation for the selected hover altitude and the hover altitude deviation display is one selected from the group comprising a circle, a triangle and a polygon.

3. The hover altitude deviation display of claim 1, including a digital representation on the multi-functional display unit of the current altitude of the aircraft and the selected hover altitude.

4. The hover altitude deviation display of claim 1, wherein the hover altitude deviation display is not a solid line representation.

5. The hover altitude deviation display of claim 1, wherein the hover altitude deviation display is a color different from the color of the selected hover altitude when the current altitude of the aircraft is not equal to the selected hover altitude.

6. The hover altitude deviation display of claim 1, wherein the hover altitude deviation display is a color the same as a color of the selected hover altitude when the current altitude of the aircraft is equal to the selected hover altitude.

7. The hover altitude deviation display of claim 1, including a low altitude setting selector disposed in interactive relation with the computer processing unit for designating a low altitude setting and the computer processing unit generating a second dynamic, analog symbolic representation when the aircraft exceeds the selected low altitude setting.

8. The hover altitude deviation display of claim 7, wherein the second dynamic, analog symbolic representation is a filling in of the hover altitude deviation display disposed on the multi-functional display unit.

9. A selected hover altitude deviation display in an aircraft having a multi-functional display unit that includes a compass rose and an aircraft symbol, the selected hover altitude deviation display comprising:

a means for generating raw data signals representing status information of current altitude of the aircraft with respect to an external environment of the aircraft, and a means for processing and for defining the spatial location and perspective of the multi-functional display unit based upon the signals generated by the means for generating raw data, the means for processing and defining being operative to generate a combined analog/digital hover altitude deviation display that provides visual representations regarding the current altitude of the aircraft with respect to a selected hover altitude, the analog/digital hover altitude deviation display comprising:

a means for representing the selected hover altitude displayed on the multi-functional display unit, and a means for providing a dynamic, analog symbolic representation of the difference between the current altitude of the aircraft and the selected hover altitude, the means for providing a dynamic, analog symbolic representation display disposed on the multi-functional display unit to provide a visual indication of the spatial location of the aircraft with respect to the selected hover altitude indicated on the multi-functional display unit.

10. The hover altitude deviation display of claim 9, including a means for digitally representing, on the multi-functional display unit, the current altitude of the aircraft and the selected hover altitude.

11. The hover altitude deviation display of claim 9, wherein the means for providing a dynamic, analog symbolic representation is not a solid line representation.

12. The hover altitude deviation display of claim 9, wherein the means for providing a dynamic, analog symbolic representation is a color different from the color of the means for representing a selected hover altitude when the current altitude of the aircraft is not equal to the selected hover altitude.

13. The hover altitude deviation display of claim 9, wherein the means for providing a dynamic, analog symbolic representation is a color the same as a color of the means for representing a selected hover altitude when the current altitude of the aircraft is equal to the selected hover altitude.

14. The hover altitude deviation display of claim 9, including a means for selecting a low altitude setting disposed in interactive relation with the means for processing and for defining, with the means for processing and defining generating a second means for representing when the aircraft exceeds the selected low altitude setting.

15. The hover altitude deviation display of claim 14, wherein the second means for representing is a filling in of the means for providing a dynamic, analog symbolic representation disposed on the multi-functional display unit.

16. A method for displaying the difference between the current altitude of an aircraft and a selected hover altitude on a multi-functional display unit that includes a compass rose and an aircraft symbol, and is operatively connected to a computer processing unit, the method for displaying comprising the steps of:

generating raw data signals representing status information of current altitude of the aircraft with respect to an external environment of the aircraft;

processing and defining the spatial location and perspective of the multi-functional display based upon the signals generated by the raw data;

selecting a hover altitude;

generating an analog hover altitude deviation display that provides visual representation regarding the current altitude of the aircraft with respect to the selected hover altitude;

displaying the analog hover altitude deviation display on the multi-functional display unit;

generating a dynamic, analog symbolic representation of the difference between the current altitude of the aircraft and the selected hover altitude; and displaying the dynamic, analog symbolic representation of the difference on the multi-functional display unit to provide a visual indication of the spatial location of the aircraft with respect to the selected hover altitude indicated on the multi-functional display unit.

17. The method for displaying the difference between the current altitude of an aircraft and a selected hover altitude of claim 16, including the step of displaying a digital representation, on the multi-functional display unit, of the current altitude of the aircraft and the selected hover altitude.

18. The method for displaying the difference between the current altitude of an aircraft and a selected hover altitude of claim 16, including the steps of displaying the selected hover altitude symbolic representation, on the multi-functional display unit, in a color different from a color of the dynamic, analog symbolic representation of the difference between the current altitude of the aircraft and the selected hover altitude.

19. The method for displaying the difference between the current altitude of an aircraft and a selected hover altitude of claim 16, including the steps of displaying the selected hover altitude symbolic representation and the dynamic, analog symbolic representation of the difference between the current altitude of the aircraft and the selected hover altitude, on the multi-functional display unit, in the same color when the current altitude of the aircraft is equal to the selected hover altitude.

20. The method for displaying the difference between the current altitude of an aircraft and a selected hover altitude of claim 16, including the steps of selecting a low altitude setting and inputting such low altitude setting into the computer processing unit and generating a symbolic representation when the aircraft exceeds the selected low altitude setting.

21. The method for displaying the difference between the current altitude of an aircraft and a selected hover altitude of claim 20, wherein the step of generating a symbolic representation when the aircraft exceeds the selected low altitude setting includes filling in such symbolic representation with a third color.

* * * * *